United States Patent [19]

Derka

[11] Patent Number: 5,194,240

[45] Date of Patent: Mar. 16, 1993

[54] MANUFACTURE OF FERRIC SULPHATE

[75] Inventor: Jaroslav R. Derka, West Hill, Canada

[73] Assignee: Eaglebrook International, Inc., Mississauga, Canada

[21] Appl. No.: 765,498

[22] Filed: Sep. 26, 1991

Related U.S. Application Data

[63] Continuation of Ser. No. 623,264, Dec. 6, 1990, abandoned, which is a continuation of Ser. No. 494,808, Mar. 14, 1990, abandoned, which is a continuation of Ser. No. 281,332, Dec. 8, 1988, abandoned.

[51] Int. Cl.$^5$ .................. C01G 49/00; C01G 49/14
[52] U.S. Cl. .................. 423/558; 423/143;
  423/145; 423/150.5; 423/DIG. 3
[58] Field of Search .............. 423/143, 145, 558, 150,
  423/41, DIG. 3

[56] References Cited

U.S. PATENT DOCUMENTS

| | | | |
|---|---|---|---|
| 1,384,974 | 7/1921 | Shaw | 423/143 |
| 1,430,551 | 10/1922 | Herrly | 423/558 |
| 2,128,311 | 8/1938 | Mertes | 423/104 |
| 2,196,584 | 4/1940 | Edison | 423/558 |
| 2,213,907 | 9/1940 | Fleckenstein et al. | 423/659 |
| 2,871,116 | 1/1959 | Clark | 423/145 |
| 3,888,748 | 6/1975 | Brennecke | 423/145 |
| 4,152,409 | 5/1979 | Nagao et al. | 423/659 |
| 4,234,560 | 11/1980 | Kuerten et al. | 423/DIG. 9 |
| 4,647,307 | 3/1987 | Raudsepp et al. | 423/143 |
| 4,693,881 | 9/1987 | Miller | 423/558 |

Primary Examiner—Gary P. Straub
Attorney, Agent, or Firm—Ivor M. Hughes

[57] ABSTRACT

A process for the manufacture of ferric sulphate from ferrous sulphate in a closed circuit or vessel comprising a liquid phase and a vapor phase, wherein the vapor phase is essentially a closed system, the process comprising the oxidation between about 70° C. to about 150° C. of $Fe^{++} \rightarrow Fe^{+++}$ under pressure utilizing commercial oxygen in the closed circuit or vessel using $(NO_x)$ as a catalyst where x is a number between 1 and 2 inclusive of 1 and 2, and wherein the process comprises the following reactions:

1) $NO + \frac{1}{2}O_2 \rightarrow NO_2$, and
2) $2FeSO_4 + H_2SO_4 + NO_2 \rightarrow Fe_2(SO_4)_3 + H_2O + NO$, and wherein the oxidation of $Fe^{++}$ is affected by spraying the reacting solution containing $Fe^{++}$ introduced to the closed circuit or vessel through a reacting cloud in the vapor phase comprising $NO$, $NO_2$ and $O_2$ enclosed in the vapor phase of the closed circuit or vessel and wherein substantially only $Fe_2(SO_4)_3$ is present in the liquid phase of the closed circuit or vessel prior to the addition of $FeSO_4$ through the reacting cloud in the vapor phase.

10 Claims, 1 Drawing Sheet

MANUFACTURE OF FERRIC SULPHATE

This application is a continuation of 07/623,264 filed Dec. 6, 1990 now abandoned, which was a continuation of 07/494,808, filed Mar. 14, 1990, now abandoned, which was a continuation of 07/281,332 filed Dec. 8, 1988, now abandoned.

FIELD OF INVENTION

This invention relates to the manufacture of ferric sulphate from ferrous sulphate utilizing ($NO_x$) as a catalyst and oxygen as the oxidant. [$NO_x$ is known to men skilled in the art as essentially a mixture of NO and $NO_2$ in undetermined ratios. Thus x is considered to be a number between 1 and 2 inclusive of 1 and 2.]

BACKGROUND OF THE INVENTION

Presently it is known to oxidize $FeSO_4$ to $Fe_2(SO_4)_3$ by $HNO_3$ (nitric acid) (for example U.S. Pat. No. 2,196,584). The reaction is described by the following simplified equation:

$$6FeSO_4 + 3H_2SO_4 + 2HNO_3 \rightarrow 3Fe_2(SO_4)_3 + 4H_2O + 2NO.$$

The disadvantage of this process is that the released NO has to be taken out of the reactor, oxidized to $NO_2$, polymerized to $N_2O_4$ and absorbed as $HNO_3$. The oxidation of NO to $NO_2$ has to be performed at low temperatures (below 120° C.) and is accompanied by the evolution of a substantial amount of heat, requiring large heat exchangers for the removal of this heat. As the reaction itself is relatively slow to reach completion a large reaction space is needed to provide sufficient residence time and the $HNO_3$ recovery section adds complications, is bulky and expensive. Another problem is that it is practically impossible to recover 100% of $NO_x$ and the emissions are, due to the poisonous nature of both NO and $NO_2$, environmentally unacceptable.

Another process employed provides for the oxidation of ferrous iron at elevated pH. In this process, it is known that the rate of the oxidation in acidic solutions is negligible for all practical purposes, however the reaction proceeds quite rapidly at pH=5 or higher. This approach has three main disadvantages:
  (a) The $SO_4$ ions coming with the $FeSO_4$ have to be neutralized.
  (b) The products of oxidation (ferric hydroxide and/or oxides) have to be separated from the products of $SO_4$ neutralization. This operation itself poses a difficult problem which is compounded by the requirements to dispose of the sulphate solution.
  (c) Ferric oxides have to be reacted with the full amount of $H_2SO_4$ to form $Fe_2(SO_4)_3$.

Oxidation in an acidic solution by utilizing a catalyst—charcoal has been performed, however the rate of oxidation increases with molar ratio $C/Fe_t$ and at technically feasible values of this ratio the rate of oxidation is quite low. Attempts to increase the rate by increasing the charcoal content introduces frothing problems and a prohibitive cost of charcoal.

Another large group of processes utilizes oxidation by oxygen (either from air or in elemental form) catalyzed by $NO_x$ dissolved in the oxidized solution in a form of $FeSO_4*NO$.

Typical examples are:

1) United Kingdom Patent No. 17,112, N. McCulloch, 1894,
2) U.S. Pat. No. 4,693,881, R. Miller, 1987,
3) Australian Patent No. 71,741, Y. Mikami, 1974,
4) Japanese Patent No. 49-31638, S. Takada, 1974,
5) Japanese Patent No. 61-286228, Nittetsu Mining KK.

These processes are characterized by low operating temperature (<60° C.) within the range of stability of $FeSO_4*NO$ complex and the oxygen (or air) is generally bubbled through the reacting solution. Oxygen has to enter solution to react with the NO complex thus the rate of reaction is hindered by low solubility of oxygen and the time required for completion of oxidation is very long. Quoting Mikami: "2.5 l. of ferrous sulphate slurry were oxidized for 17 hours". (This is to compare with our oxidation rate of 2.25 l. completely oxidized in 20 minutes.) Miller in his simplest version releases the desorbed $NO_x$ with off-gas to atmosphere. Quoting: "none of the NO which reaches the top of the regeneration reactor is recovered".

The process is not environmentally safe as it discharges large quantities of off-gas containing 0.03–0.15% NO.

Miller tries to solve this problem by complicated systems for recovery of the desorbed NO including conversion to and recovery as $HNO_3$.

This is to compare with our system where NO is permanently closed in the reactor gas space and only a small bleed-off stream (approximately 3 m³/h) is, after removal of NO by feed slurry, leaves the process.

It is therefore an object of this invention to provide an improved process for the manufacture of ferric sulphate.

It is a further object of the invention to provide such process which is very efficient and environmentally safe.

Further and other objects of this invention will be realized by those skilled in the art from the following summary of invention and detailed description of the embodiments thereof.

SUMMARY OF THE INVENTION

According to one aspect of the invention, a process for the manufacture of ferric sulphate from ferrous sulphate (in one embodiment crystals, in another embodiment with the addition of pickle liquor) by the oxidation of $Fe^{++} \rightarrow Fe^{+++}$ under pressure utilizing ($NO_x$) as a catalyst and oxygen in a closed circuit or vessel having a liquid (solution) phase and a vapour phase is provided.

According to another aspect of the invention there is provided a process for the manufacture of ferric sulphate from ferrous sulphate in a closed circuit or vessel comprising a liquid phase and a vapour phase, wherein the vapour phase is essentially a closed system the process comprising the oxidation between about 70° C. to about 150° C. of $Fe^{++} \rightarrow Fe^{+++}$ under pressure utilizing commercial oxygen in the closed circuit or vessel using ($NO_x$) as a catalyst where x is a number between 1 and 2 inclusive of 1 and 2 and wherein the process comprises the following reactions:

1) $NO + \frac{1}{2}O_2 \rightarrow NO_2$, and

2) $2FeSO_4 + H_2SO_4 + NO_2 \rightarrow Fe_2(SO_4)_3 + H_2O + NO$, and wherein the oxidation of $Fe^{++}$ is affected by spraying the reacting solution containing $Fe^{++}$ introduced to the closed circuit or vessel through a reacting cloud in the vapour phase comprising NO, $NO_2$ and $O_2$ enclosed in the vapour phase of the closed circuit or vessel and wherein substantially only $Fe_2(SO_4)_3$ is present in the liquid phase of the closed circuit or vessel prior to the addition of $FeSO_4$ through the reacting cloud in the vapour phase.

According to another aspect of the invention there is provided a process for the manufacture of ferric sulphate from ferrous sulphate in a closed vessel containing a liquid phase and a vapour phase, the process comprising the oxidation between about 70° C. to about 150° C. of $Fe^{++}$ to $Fe^{+++}$ under pressure utilizing commercial oxygen in the closed vessel using $NO_x$ as a catalyst where x is a number between 1 and 2 inclusive of 1 and 2 and wherein the process comprises the following reactions:

1) $NO + \tfrac{1}{2}O_2 \rightarrow NO_2$, and

2) $2FeSO_4 + H_2SO_4 + NO_2 \rightarrow Fe_2(SO_4)_3 + H_2O + NO$, wherein the oxidation of $Fe^{++}$ is affected by spraying a solution containing $Fe^{++}$ introduced to the closed vessel through a reacting cloud comprising NO, $NO_2$ and $O_2$ enclosed in the vapour space of the closed vessel and wherein the liquid phase fills at least $\tfrac{1}{3}$ of the vessel and substantially only $Fe_2(SO_4)_3$ is present in the liquid phase in the closed vessel prior to the addition of $FeSO_4$ through the reacting cloud in the vapour phase and wherein the liquid phase is also sprayed through the vapour phase.

According the another aspect of the invention there is provided another process for the manufacture of ferric sulphate from ferrous sulphate in a closed vessel containing a liquid phase and a vapour phase, the process comprising the oxidation between about 70° C. to about 150° C. of $Fe^{++}$ to $Fe^{+++}$ under pressure utilizing commercial oxygen in the closed vessel using $NO_x$ as a catalyst where x is a number between 1 and 2 inclusive of 1 and 2 and wherein the process comprises the following reactions:

1) $NO \tfrac{1}{2}O_2 \rightarrow NO_2$, and

2) $2FeSO_4 + NO_2 \rightarrow Fe_2(SO_4)_3 + H_2O + NO$, wherein the oxidation of $Fe^{++}$ is affected by spraying a solution containing $Fe^{++}$ introduced to the closed vessel through a reacting cloud comprising No, $NO_2$ and $O_2$ enclosed in the vapour space of the closed vessel and wherein the liquid phase fills at least $\tfrac{1}{3}$ of the vessel and substantially only $Fe_2(SO_4)_3$ is present in the liquid phase in the closed vessel during the addition of $FeSO_4$ through the reacting cloud in the vapour phase and wherein the liquid phase is also sprayed through the vapour phase.

Oxidation of ferrous iron is essentially accomplished in the vapour phase in the reactor which can be a single or multiple vessel/compartment. In the reactor $NO_x$ is trapped in the vapor phase (space) above the solution. The present NO then rapidly reacts with the supplied oxygen according to the reaction:

1) $NO + \tfrac{1}{2}O_2 \rightarrow NO_2$.

The solution containing the $FeSO_4$ introduced to the circuit or vessel is sprayed through this "reacting cloud" (the vapour phase essentially comprising NO, $NO_2$ and oxygen), cooling the reacting gas by removing the heat of reaction and reacting with formed $NO_x$:

2) $2FeSO_4 + H_2SO_4 + NO_2 \rightarrow Fe_2(SO_4)_3 + H_2O + NO$.

The NO released by reaction 2) is immediately available for reaction 1). $NO_x$ acts as a catalyst in the oxidation process.

The temperature in the reactor is maintained above the point of decomposition (theoretically 60°-65° C.) of the $FeSO_4$*NO complex (which at lower temperatures is stable and is formed at such lower temperatures). Thus NO produced by reaction 2) is released back to the reacting cloud rather than being oxidized in the solution with the consequent low rate of reaction due to the low solubility of oxygen. The oxidation of NO in the gas phase is a relatively fast well-defined reaction. Thus in one application if the reactor is divided into compartments, with $FeSO_4$ slurry and $H_2SO_4$ introduced through the reacting cloud at one end into the first compartment and the reaction is permitted to proceed, with additional product causing overflowing into the next compartment and so on, down the length of the vessel, and oxygen (and $HNO_3$ make-up for $NO_x$) are added to the last compartment, the NO formed in reaction 1) is converted to $NO_2$ which will then oxidize another portion of $FeSO_4$ introduced through the vapour phase.

The produced solution containing traces of NO is denitrated in a $NO_x$ desorption vessel by bubbling of feed oxygen through the solution before it is used in the reactor for oxidation. The stream of oxygen then carries the desorbed NO back to the "reacting cloud" in the vapor phase—space of reactor.

The $Fe_2(SO_4)_3$ solution may then be filtered and stored.

The oxidation may be carried out continuously in different vessels connected one to the other (liquid phase overflowing to next vessel and vapour phases being interconnected and in communication with one another) or may be carried out in a batch in one vessel. The materials may be added in a sluice tank ($FeSO_4$ and water) and mixed and then fed to continuous process or batch process. The $H_2SO_4 + NO_x$ make-up ($HNO_3$) are added directly to the reactor.

In the batch process, the oxygen stream from the denitrator is also added to the reactor. When the reactions are completed producing $Fe_2(SO_4)_3$, the $Fe_2(SO_4)_3$ solution is removed. To produce batches successively in the same vessel, only part (for example $\tfrac{2}{3}$) of the volume is removed, and the remaining portion (for example $\tfrac{1}{3}$) is left. This heats the incoming slurry to the temperature required for initiation of the oxidizing reaction. For the reaction to proceed quickly, the temperature should preferably equal or exceed 90° C. Thus the remaining solution provides the temperature for the initiation of the reaction and the "Heat of Reaction" heats the materials added to the reactor. Additionally $Fe_2(SO_4)_3$ remains in the solution to keep the $NO_x$ out of the solution and in the vapour phase ($NO_x$ has low solubility in $Fe_2(SO_4)_3$). A small portion of gases present in the vapour phase above the slurry solution are bled off to facilitate the removal of any inert gas present and returned to the sluice tank for mixing with the slurry.

The withdrawn ferric sulphate solution is denitrated in $NO_x$ desorption vessel by bubbling oxygen through the solution and subsequent cooling. The solution may then be filtered and sent to product storage.

The heat recovered from the product cooling heat exchanger may be used for preheating of water or pickle liquor needed for preparation of feed slurry.

BRIEF DESCRIPTION OF THE DRAWINGS

The invention will now be illustrated with reference to processes according to embodiments of the invention illustrated schematically in flowsheet (FIG. 1).

DETAILED DESCRIPTION OF PREFERRED EMBODIMENTS OF THE INVENTION

Figure 1:
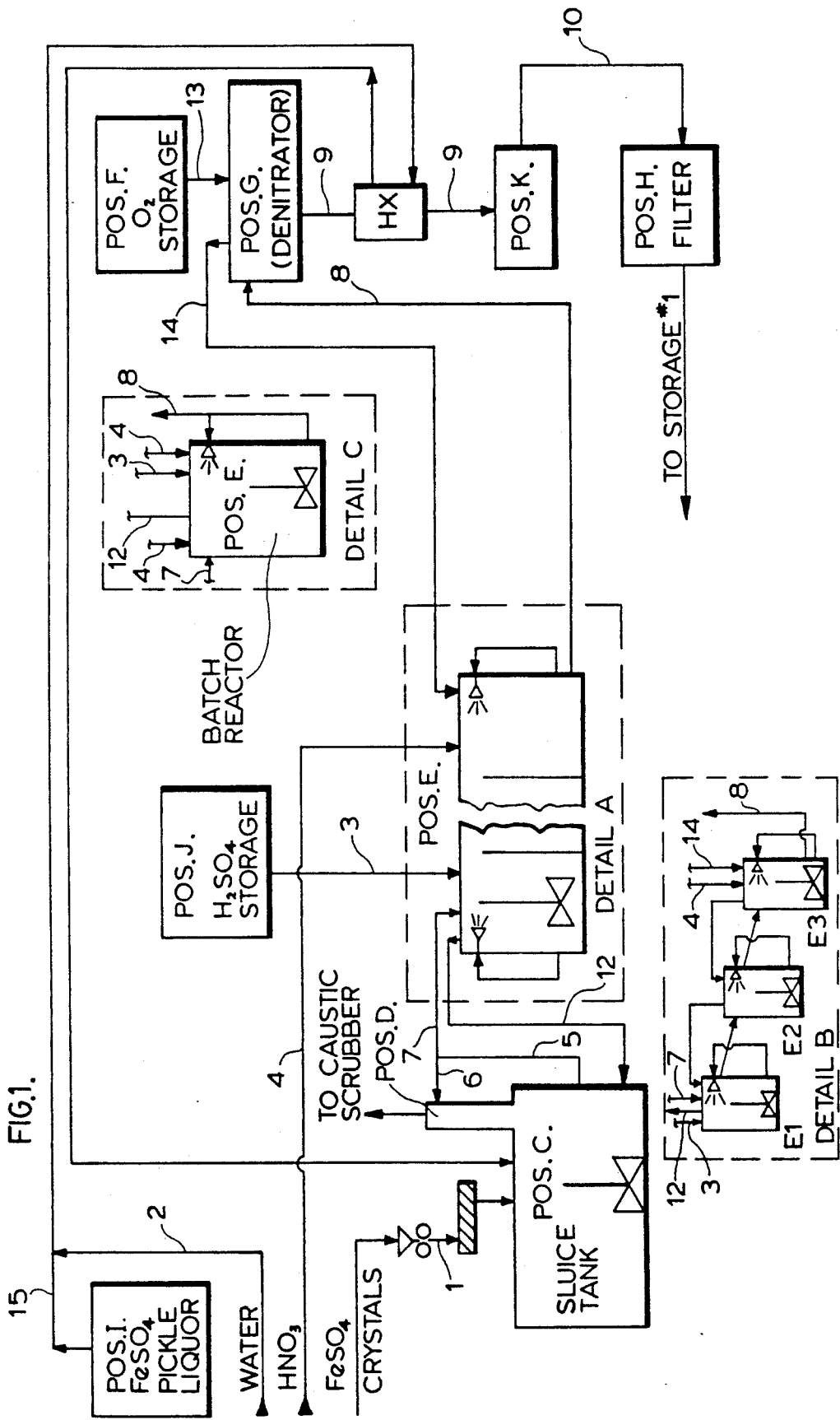

Ferrous sulphate crystals are, after delumping in a suitable crushing device such as a roller mill (position A), transported by screw conveyor (position B) as stream 1 into a sluice tank (position C). In this tank a suitable slurry is formed by an addition of the required amount of water (stream 2). Instead of water a pickle liquor (stream 15) may be used with consequential savings in crystals and sulphuric acid.

A slurry of correct composition (stream 5) for the reaction:

$$2FeSO_4 + H_2SO_4 + \tfrac{1}{2}O_2 = Fe_2(SO_4)_3 + H_2O$$

is fed (stream 7) as well as sulphuric acid (stream 3) and occasionally $HNO_3$ make-up (stream 4) to a reactor (position E) which can be either continuous—flowsheet (FIG. 1) Details A and B, or batch—Detail C. Detail A illustrates a reactor where a single closed vessel is divided into compartments with the slurry and sulphuric acid added by spraying upstream of the vessel and oxygen and $HNO_3$ make-up added downstream. The same with Detail B which illustrates three separate vessels $E_1$, $E_2$, and $E_3$ whose vapour phases are connected and whose liquid phases overflow counter-currently to gas phase—slurry added by spraying to upstream vessel $E_1$ with oxygen downstream at vessel $E_3$. With respect to Details A, B and C, position G acts as the denitrator.

In the reactor, oxidation under pressure by oxygen (stream 14) takes place, $NO_x$ acting as the catalyst of oxidation. The function of $NO_x$ can be expressed in a simplified form as:

1) $NO + 0.5O_2 = NO_2$, and the ferrous iron is oxidized:

2) $2FeSO_4 + H_2SO_4 + NO_2 = Fe_2(SO_4)_3 + NO + H_2O$.

The reaction 1) takes place in the reacting cloud consisting of $NO_x$, $O_2$ and water vapour, located in the vapor space of the reactor. There the produced $NO_2$ is contacted by spray of the solution and the reaction 2) proceeds.

The product ferric sulphate solution (stream 8), with some $NO_x$ dissolved in it due to high partial pressure of $NO_x$ in the reactor, is denitrated in the $NO_x$ removal vessel (position G), by purging the solution with bubbles of oxygen required for reaction (stream 13). The oxygen with desorbed $NO_x$ is then fed to the reactor (stream 14). The NO free solution (stream 9) is cooled in heat exchanger and sent to a pump tank (position K) and pumped (stream 10) through a clarifier filter (position H) to storage (stream 11). Heat removed in the heat exchanger is used for preheating liquids (water or pickle liquor) for slurry preparation. As commercial oxygen always contains some nitrogen, its accumulation in the vapour space of the reactor is avoided by a small bleed-off stream (stream 12). This bleed-off stream is in one application sent to the bottom of the sluice tank (position C) where $NO_x$ is removed by contact with $FeSO_4$ slurry in the sluice tank. This step utilizes the formation of nitrosyl ferrous sulphate in a $FeSO_4$ solution at temperature $<60°$ C. for the absorption of NO. The $NO_x$ catalyst is then returned to the reactor with the feed slurry (stream 7) introduced through the vapour phase.

In other applications the NO containing gas (stream 13) is scrubbed in a ferrous sulphate scrubber (position D) by $FeSO_4$ slurry (stream 6) because on contact the $FeSO_4$ dissolves the $NO_x$ returning it to sluice tank (position C) and subsequently to reactor (position E). $NO_x$ free gas, for additional safety, leaves the process through a caustic scrubber, thus $N_2$ (nitrogen) and $O_2$ (oxygen) are permitted to leave to atmosphere.

Typical operating parameters:

| Typical operating parameters: | | |
|---|---|---|
| 1) | Sluice Tank: | |
| | t | ambient, |
| | maximum | 60° C. |
| 2) | Reactor: | |
| | temperature | about decomposition temperature of $FeSO_4$•NO complex and preferably about 70° C. to about 150° C., most desirable 90°–120° C. |
| | pressure | 20–100 psig. preferably 40–60 psig |
| 3) | Product - ferric sulphate solution: | |
| | typical | 190 g. Fe/l. |
| | range | 60–250 g. Fe/l. |

With respect to Detail C (which depicts a batch process), when $Fe_2(SO_4)_3$ is to be withdrawn, it is preferable that only ⅔ of the volume is removed. The remaining ⅓ volume containing essentially $Fe_2(SO_4)_3$ is usually at a temperature exceeding 90° C., the temperature at which the reaction proceeds quickly, and thus provides the heat of reaction to cause added cold materials to react quickly to oxidize $Fe^{++} \rightarrow Fe^{+++}$. As well the $Fe_2(SO_4)_3$ left in the liquid phase keeps $NO_x$ in the vapour phase to enable an increased rate of reaction due to the decrease in solubility of NO (product of Fe oxidation) in the Ferric Sulphate. In that case more NO is available for oxidation in the gaseous phase. In the result whereas Mertes (U.S. Pat. No. 2,128,311) whose oxidation was taking place in the liquid phase was achieving oxidation of 0.12 to 0.48 grams of Ferrous to Ferric per liter an hour my process oxidizes in one example, 88 grams Ferrous to Ferric per liter per hour considering total reactor space and in the one example 220 grams Ferrous to Ferric per liter per hour considering the liquid phase only. Solution accumulates in the reactor. On reaching the high level, the feeding of slurry or solution is stopped and on completion of the oxidation, the product (solution) is released through denitrator (position G) where the product is purged by a stream of oxygen passing from position G into reactor (position E) displacing liquid volume in the reactor (position E).

As many changes can be made to the embodiments of the invention without departing from the scope of the invention, it is intended that all material contained herein by interpreted as illustrative of the invention and not in a limiting sense.

The embodiments of the invention in which an exclusive property or privilege is claimed are as follows:

1. A process for the manufacture of ferric sulphate from ferrous sulphate in a closed vessel containing a liquid phase and a vapour phase, wherein the vapour phase is essentially a closed system, the process comprising the oxidation between about 70° C. to about 150° C. of $Fe^{++}$ to $Fe^{+++}$ under pressure utilizing commercial oxygen in the closed vessel using $NO_x$ as a catalyst where x is a number between 1 and 2 inclusive of 1 and 2, and wherein the process comprises the following reactions:

$$NO + \tfrac{1}{2}O_2 \rightarrow NO_2, \text{ and} \qquad (1)$$

$$2FeSO_4 + H_2SO_4 NO_2 \rightarrow Fe_2(SO_4)_3 + H_2O + NO. \qquad (2)$$

and wherein the oxidation of $Fe^{++}$ is affected by spraying a reacting solution containing $Fe^{++}$ introduced to the closed vessel, through a reacting cloud in the vapour phase comprising NO, $NO_2$ and $O_2$ enclosed in the vapour phase of the closed vessel and wherein the liquid phase fills at least ⅓ of the vessel and substantially only $Fe_2(SO_4)_3$ is present in the liquid phase in the closed vessel prior to the addition of $FeSO_4$ through the reacting cloud in the vapour phase and wherein the liquid phase is also sprayed through the vapour phase.

2. The process of claim 1 wherein the process is carried out continuously in one vessel.

3. The process of claim 2 wherein the $Fe(SO_4)_2$ and water are added in a sluice tank and mixed and the resultant solution is added to the vessel.

4. The process of claim 2 wherein the $Fe_2(SO_4)_3$ solution is removed through the denitrator.

5. The process of claim 2 wherein the $Fe_2(SO_4)_3$ solution is supplied to a denitrator, where oxygen is supplied to denitrate said solution and the resultant gas is then passed to said vessel from the denitrator.

6. A process for the manufacture of ferric sulphate from ferrous sulphate in a closed vessel containing a liquid phase and a vapour phase, wherein the vapour phase is essentially a closed system, the process comprising the oxidation between about 70° C. to about 150° C. of $Fe^{++}$ to $Fe^{+++}$ under pressure utilizing commercial oxygen in the closed vessel using $NO_x$ as a catalyst where x is a number between 1 and 2 inclusive of 1 and 2, and wherein the process comprises the following reactions:

$$NO + \tfrac{1}{2}O_2 \rightarrow NO_2, \text{ and} \qquad (1)$$

$$2FeSO_4 + H_2SO_4 NO_2 \rightarrow Fe_2(SO_4)_3 + H_2O + NO. \qquad (2)$$

and wherein the oxidation of $Fe^{++}$ is affected by spraying a reacting solution containing $Fe^{++}$ introduced to the closed vessel, through a reacting cloud in the vapour phase comprising NO, $NO_2$ and $O_2$ enclosed in the vapour phase of the closed vessel and wherein the liquid phase fills at least ⅓ of the vessel and substantially only $Fe_2(SO_4)_3$ is present in the liquid phase in the closed vessel during the addition of $FeSO_4$ through the reacting cloud in the vapour phase and wherein the liquid phase is also sprayed through the vapour phase.

7. The process of claim 6 wherein the process is carried out continuously in one vessel.

8. The process of claim 7 wherein the $FeSO_4$ and water are added in a sluice tank and mixed and the resultant solution added to the vessel.

9. The process of claim 7 wherein the $Fe_2(SO_4)_3$ solution is supplied to a denitrator, where oxygen is supplied to denitrate said solution and the resultant gas is then passed to said vessel.

10. The process of claim 9 wherein the $Fe_2(SO_4)_3$ solution is removed through the denitrator.

* * * * *